United States Patent [19]

Whiteman

[11] Patent Number: 4,542,932
[45] Date of Patent: Sep. 24, 1985

[54] FOLD-UP CAMPER

[76] Inventor: Gary D. Whiteman, 2630 Townsgate Rd., Unit H, Westlake Village, Calif. 91361

[21] Appl. No.: 543,310

[22] Filed: Oct. 19, 1983

[51] Int. Cl.[4] .............................................. B60P 3/34
[52] U.S. Cl. ................................... 296/160; 296/161; 296/26; 135/88
[58] Field of Search .................... 296/26, 27, 160, 161; 135/88

[56] References Cited

U.S. PATENT DOCUMENTS

| | | | |
|---|---|---|---|
| 3,009,212 | 11/1961 | Makens | 296/156 |
| 3,088,475 | 5/1963 | Muhr | 135/88 |
| 3,466,082 | 9/1969 | Branch | 296/174 |
| 3,466,083 | 9/1969 | Owen | 135/88 |
| 3,658,375 | 4/1972 | Bowen | 296/164 |
| 3,680,909 | 8/1972 | Greif | 296/161 |
| 3,702,617 | 11/1972 | Franzen | 135/88 |
| 3,712,315 | 1/1973 | Franzen | 135/88 |
| 3,737,190 | 6/1973 | Smith | 296/159 |
| 3,763,607 | 10/1973 | Glover | 135/88 |
| 4,088,363 | 5/1978 | Palmer | 296/27 |
| 4,188,963 | 2/1980 | Janoe | 135/88 |
| 4,220,369 | 9/1980 | Whitley | 296/164 |
| 4,271,856 | 6/1981 | Ferguson | 135/88 |
| 4,294,484 | 10/1981 | Robertson | 296/156 |
| 4,310,194 | 1/1982 | Biller | 296/27 |
| 4,462,631 | 7/1984 | Lange | 296/26 |

*Primary Examiner*—Robert R. Song
*Attorney, Agent, or Firm*—Koppel & Harris

[57] ABSTRACT

A collapsible camper has a container mounted on the top of a pick-up truck cab. The container is formed from a cover having a rear, generally vertically wall and an upper, horizontal wall pivoting to a base. A front wall also pivots with respect to the base between an angled position and a vertical position. A foldable canopy is stored within the container cavity. To deploy the canopy, the cover is pivoted so that the generally vertical portion of the cover extends downward below the base, and the horizontal portion of the cover extends horizontally to act as a shelf, a U-shaped brace mounts between the canopy and the side walls of the pickup truck. A side wall of the container folds downward so that the top surface of the base is wide enough to be a sleeping surface, and its downward pivoting and the upward pivoting of the front wall are accomplished by a single linkage.

9 Claims, 7 Drawing Figures 4,542,932

FOLD-UP CAMPER

BACKGROUND OF INVENTION

1. Field of Invention

This invention relates to fold-up campers that are carried on a vehicle.

2. Description of the Prior Art

There have been numerous attempts at constructing campers that can be mounted on vehicles and that collapse at least partially for more compact storage. Some utilize the bed of a pick-up truck. For example, Branch, U.S. Pat. No. 3,466,082 (1969) mounts a tent-like structure over the bed of a pick-up truck, and Owen, U.S. Pat. No. 3,466,083 (1969) has a partially collapsible camper frame supported in a pick-up truck body. None of these units, however, are completely collapsible. Greif, U.S. Pat. No. 3,680,909 (1972) discloses a tent camper that folds into a storage unit mounted on top of a station wagon-like vehicle. The tent folds beyond the rear of the vehicle. Franzen, U.S. Pat. No. 3,712,315 (1972) also mounts a collapsible tent on a storage unit on top of a vehicle. The unit is adapted for use on a standard automobile, and the tent also extends beyond the rear of the car.

The bed of a pick-up truck is well suited for camping. It is elevated so that one need not sleep on the ground, and the side walls of the bed can accommodate various cabinets and other storage means where camping equipment can be housed for easy access. It is best, however, if the tent structure is not stored on the bed because the bed is often needed for carrying other items either on a day-to-day basis or for a particular camping trip.

The roof of a pick-up truck offers a convenient place to store a tent, but because of limited area, it is necessary to accommodate a tent and its storage housing in a relatively small space. Aerodynamics are a consideration because on the pick-up truck roof, the storage container will contribute to air drag.

SUMMARY OF THE INVENTION

It is a principal object of the present invention to disclose and provide a collapsible camper that (1) is stored in a small volume, (2) opens easily and extends over the bed of a pick-up truck or other similar vehicle, (3) provides sleeping and other surfaces, (4) is aerodynamic in its closed position, and (5) is easily constructed and of a relatively low cost. Other objects of the present invention will be identified in the Detailed Description of the Preferred Embodiment.

The collapsible camper of the present invention has a container including a base mounted on the top of a cab of a pick-up truck or other similar vehicle. A generally rigid cover attaches to the base in two positions. In the upper position, the cover is generally above the base and acts to create the container with a cavity between the base and the cover where the flexible canopy is stored. In the lower position, the cover depends from the base over the bed of the pick-up truck to create a lower platform, and the canopy then extends over the cover to a remote location at the rear of the truck bed. Preferably, the cover has an upward portion that forms a rear wall for the container and a generally horizontal member. The bottom of the upward portion that is hinged to the rear of the base, and in the lower position, this upward portion depends generally downward, and the horizontal member extends horizontally above the bed of the camper. A front member that is normally angled upward and rearward from the forward portion of the base meets the front of the cover when it is in its upper position. The angled wall acts aerodynamically to reduce wind resistance. It pivots to a veritical position when the camper is to be used to allow more room above the top surface of the base.

The canopy has a strut that is mounted to the base when the canopy is removed from the cavity to support a portion of the canopy above the base. A U-shaped brace, which may be carried in the bed of the pick-up truck, attaches to the bed or the side walls and extends up and away from the base when the canopy is extended to hold the top of the canopy above the truck bed in a generally tight configuration. The legs of the brace can be adjusted.

Side walls attached to the base close the container when the cover is in its upper position. At least one of the sides folds downward to be horizontal, parallel to the base to add to the width of the base when the canopy is in its opened position. A linkage may be provided to fold that side wall to its horizontal position when the front wall is pivoted to its vertical position.

DETAILED DESCRIPTION OF THE PREFERRED EMBODIMENT

Figure 1:
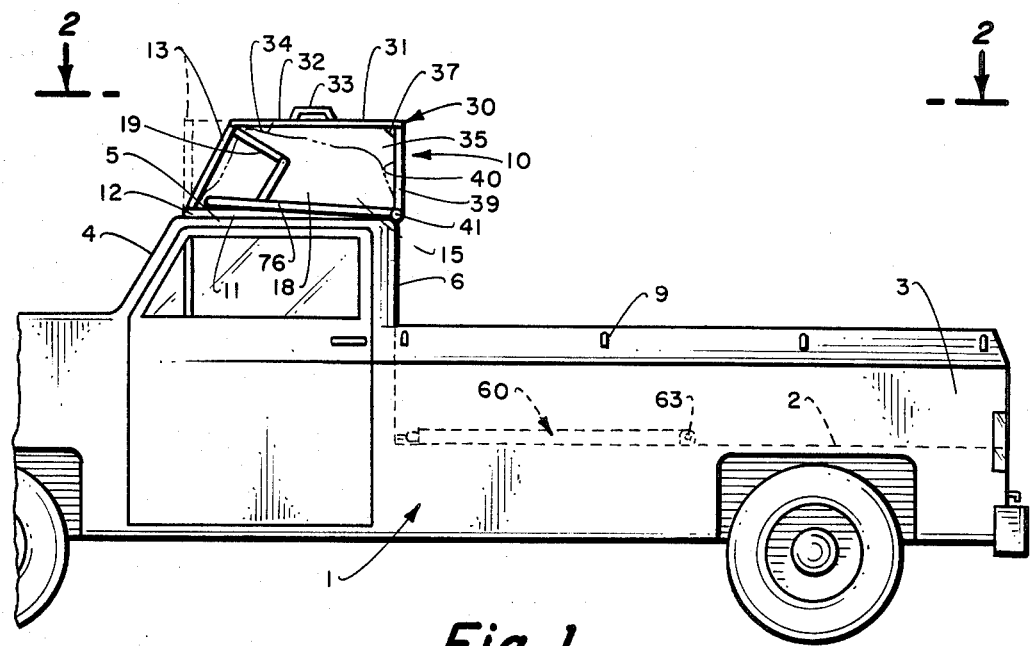
FIG. 1 is a side elevation, partially cut away of the fold-up camper of the present invention mounted on the roof of a pick-up truck.
Figure 2:
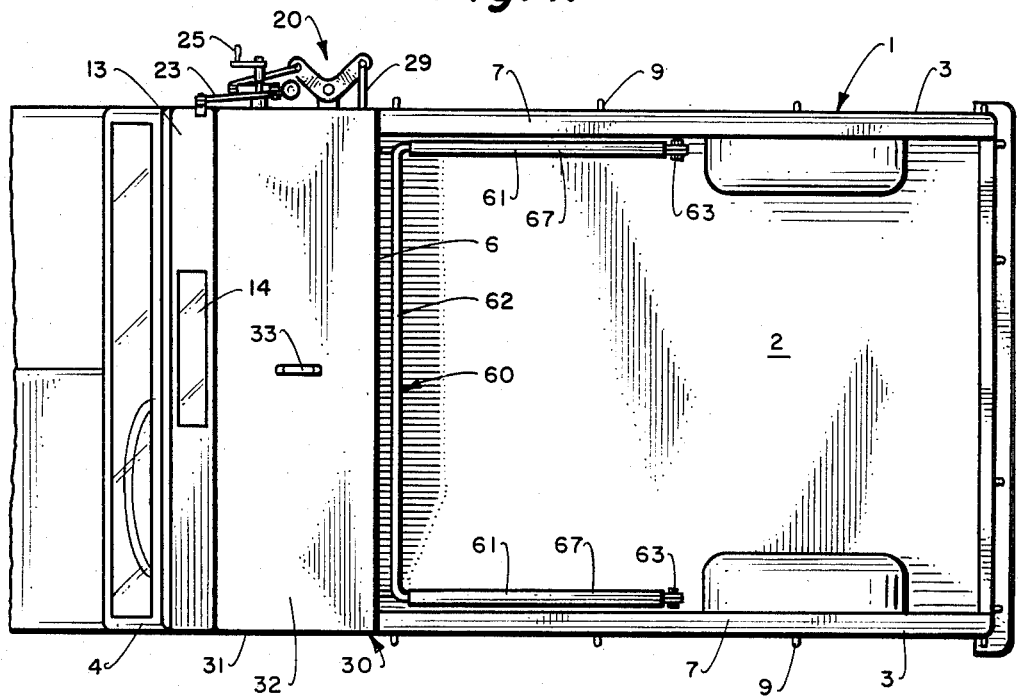
FIG. 2 is a plan view taken through plane 2—2 of FIG. 1 looking down on the pick-up truck and the fold-up camper of the present invention in its closed position.
Figure 3:
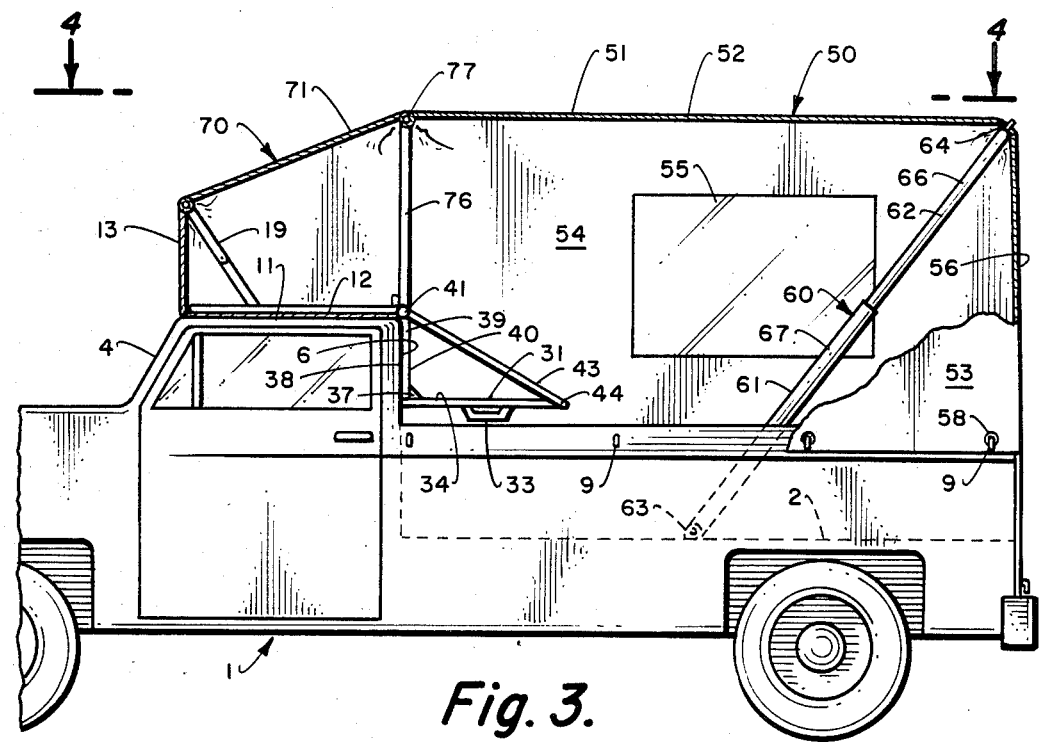
FIG. 3 is a side elevation, partially cut away of the fold-up camper of the present invention in its open position.

The collapsible camper of the present invention comprises a container having a base mounted to an elevated position of the vehicle. Although the present invention is useful with many different types of vehicles, it is shown being used on a standard pick-up truck 1 (FIGS. 1 and 3). The truck has a rear bed 2 (FIGS. 1 and 2) with upstanding side walls 3, and a cab with an elevated portion 4, which has a roof 5 and a rear wall 6.

Container 10, which houses the canopy and is part of the structure of the camper, has a base 11 having a bottom wall 12 and a front wall 13 extending upward from the front edge of bottom wall 12. Means are provided for anchoring the base to the roof 5 of truck 1. Such means may include one or more clamps for attaching the edges of the base to the roof gutters of the truck. Such a mounting would be intended to be somewhat temporary and provide for easy removal of container 10 from off of the roof 5 of the truck. Container 10 may also be permanently connected by bolts or other fasteners passing through bottom wall 12 and roof 5.

Container 10 also includes a cover 30 (FIG. 1) which has a generally vertical portion 39 extending from the rear edge of bottom wall 12 and a horizontal portion 31 extending forward from the top edge of vertical wall 39. A brace in the form of a L-bracket 37 or other small bracket may be provided to add rigidity to the connection between the horizontal portion 31 and the vertical portion 39 of cover 30. Bottom wall 12, front wall 13, horizontal wall 31 and vertical wall 39 are each preferably formed from a rigid, strong, light-weight material such as fiberglass, but aluminum or other light-weight metals work well.

Cover means 30 is mounted in two positions. In the upper position (FIG. 1), the cover extends above base means 11 to create a cavity 35 between base 11 and cover 30. In the lower position (FIG. 3) the cover depends from base 11 below the roof 5 of the truck. The simplest way to move the cover between its upper and lower positions is to hinge the cover relative to the base. In the exemplary embodiment, a hinge 41 is provided along the rear edge of bottom wall 12. In order for cover 30 to hinge relative to base 11, the hinge 41 and the rear edge of base 11 must be slightly rearward of the rear edge of roof 5. For ease of manipulating the cover, handle 33 may be provided on the top surface 32 of horizontal wall 31. In the FIG. 3 position, the rear face 38 of vertical wall 39 rests against rear wall 6 of cab 4. A strap 43, extending from the rear edge 44 of horizontal wall 31 to the rear of hinge 41, acts to support horizontal wall 31 from vertical loads (FIG. 3). The top end of strap 43 may also be mounted to the top surface of bottom wall 12 (FIG. 1).

Figure 4:
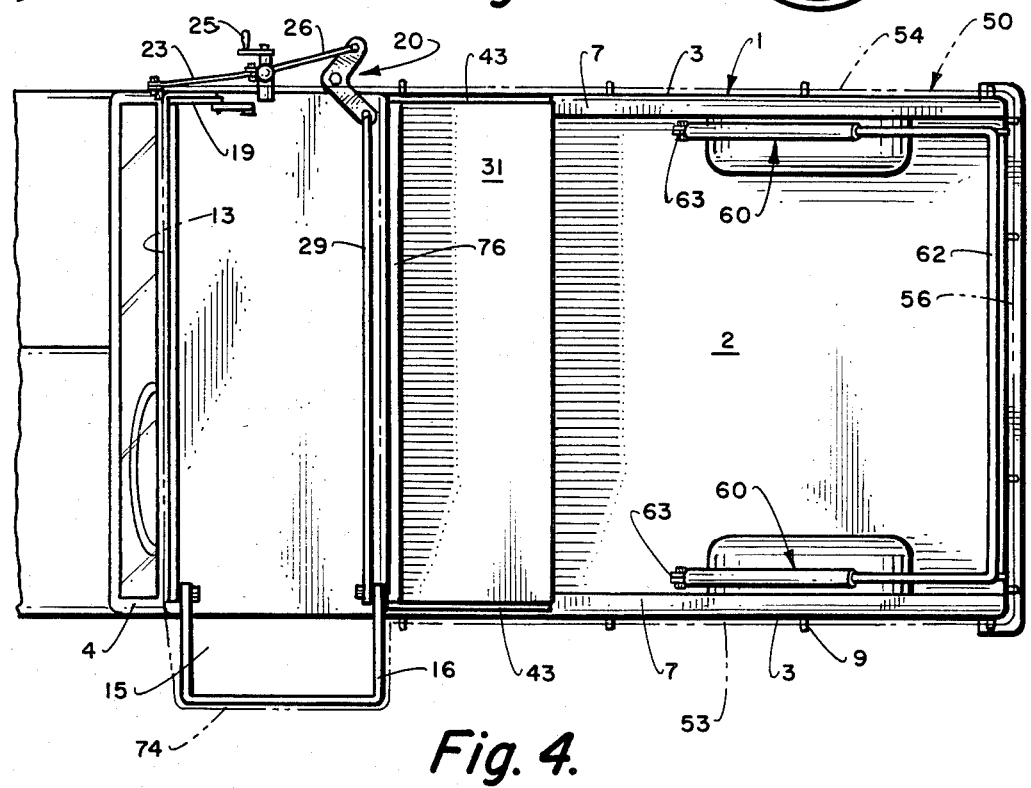
FIG. 4 is a plan view of the camper in its opened position taken through plane 4—4 of FIG. 3.
Figure 5:
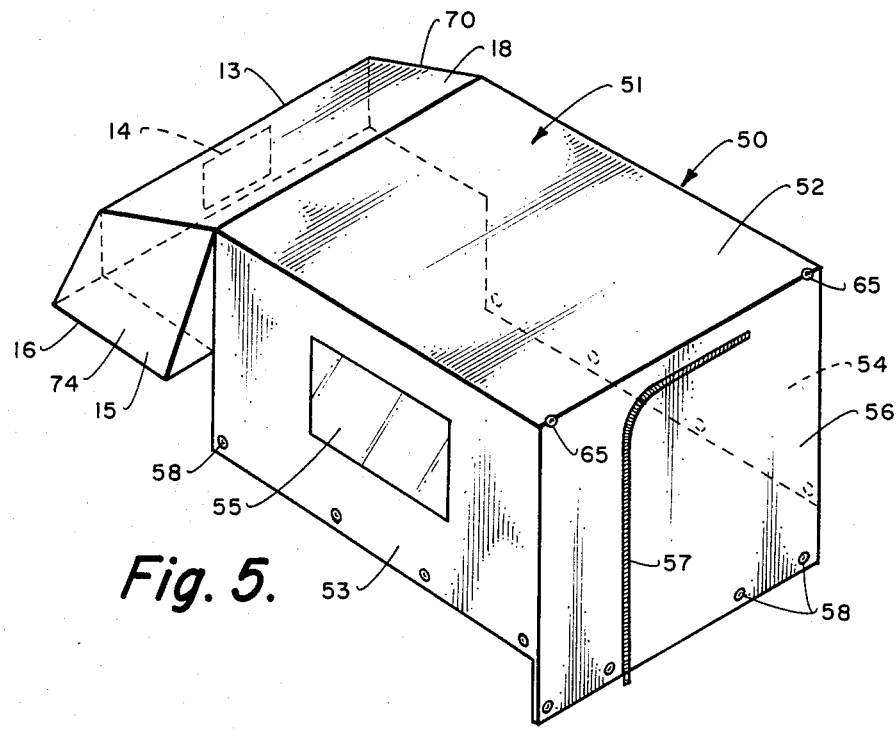
FIG. 5 is a perspective view of the canopy of the fold-up camper along with some of the structure of the container that holds the canopy.

A canopy is attached to the inside of the container and is foldable into cavity 35 when the container is in its FIG. 1 position. When cover 30 is in its FIG. 4 position, the canopy can fold out over the cover to a remote location at the rear of the vehicle to act as a tent (FIG. 3). In the exemplary embodiment, canopy 50 has a rear, relatively large portion 51 that extends over bed 2 of truck 1. The canopy is preferably formed of canvas, nylon or other tenting material. In the exemplary embodiment, the rear portion 51 has a roof 52 and two depending side walls 53 and 54 (FIG. 5). The side walls 53 may have one or more openings 55 to act as windows. A rear wall 56 is also provided, and it has a zippered door 57 to allow entry into the tent-like structure of the canopy. A number of grommeted holes 58 are spaced along the bottom edges of the side walls and rear walls of canopy 50 (FIG. 5), and hooks 9 spaced along the outside wall of the upper portion of side walls 3 of truck 1 (FIGS. 3 and 4) engage the holes 58 to secure the side walls 53 and 54 of canopy 50 to the side walls 3 of truck 1.

An anchor extends between the canopy and the vehicle for anchoring the canopy to its remote location. The anchor in the exemplary embodiment is a U-shaped brace 60 (FIGS. 1-4) which has legs 61 extending down from a cross bar 62. The brace is stored such that legs 61 lie along the edge of bed 2 adjacent the side walls 3 (FIG. 2) and attached to a fixture 63 that permits pivoting of legs 61. When the canopy is in its opened position. (FIGS. 3 and 4), U-shaped brace 60 is pivoted to the position shown in FIGS. 3 and 4. Short nobs 64 on cross bar 62 extend through grommeted holes 65 near the rear edge of roof 52.

Legs 61 of U-shaped brace 60 are tubular, and an upper portion 66 telescopes from a lower portion 67. When nobs 64 are inserted through holes 65, the upper portion 66 of arm 60 is telescoped out of lower portion 67 until roof 51 is relatively tight and the canopy 50 assumes generally its FIG. 4 configuration. Although fixture 63, which mounts U-shaped brace 60 to truck 1 in the exemplary embodiment is on bed 2, it could be mounted along the inside surface of side walls 3 or even along the top surface 7 of the side walls. Only two grommeted openings 65 are shown along the rear edge of room 52, but cross bar 62 of U-shaped brace 60 could have additional nobs that would engage other grommeted openings spaced along the edge of roof 52.

Canopy 50 also has a forward portion 70 (FIGS. 3 and 5). The forward portion has a roof 71 that slopes slightly downward from roof 52 of rear portion 51. The front edge of roof 71 is attached to the inside of front wall 13 near the top edge (FIG. 3). Note that the front wall can pivot between its solid line position (FIG. 1) to a position in phantom in FIG. 1, also shown in FIG. 3. As will be explained in more detail below, container 10 also has a side wall 15 (FIG. 1) that extends upward attached to one side of bottom wall 12 (FIG. 1) that extends upward attached to one side of bottom wall 12 of base 11 to enclose the cavity 35 formed in the container. At least one side wall 15 pivots downward so that it is parallel with bottom wall 12 and acts as an extension for it. The pivoting will be discussed below. One of the side edges 74 of canopy 50 (FIG. 5) is attached to the inside near top or outside edge 16 of side wall 15. Another edge of the forward portion 70 of canopy 50 attaches to the other side wall 18. The other side wall is intended to be fixed to base 11.

In the closed position, forward wall 13, which may have a window 14 for ventilation (FIGS. 2 and 5), is slanted back (FIG. 1) for improved aerodynamics, but when the device is to be used for camping, it is desirable to have increased space above the top surface of bottom wall 12. Therefore, means are provided for pivoting forward wall 13 to a generally vertical position (in phantom in FIG. 1). The forward wall 13 can be pulled to its vertical position, and a folding brace 19 (FIG. 3) anchors forward wall 13 in its vertical position.

Figure 6:
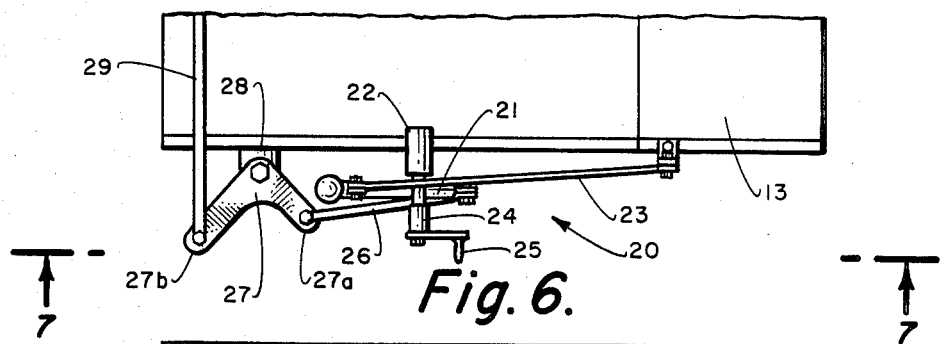
FIG. 6 is a plan view, partially cut away of a linkage mechanism for opening various parts of the fold-up camper of the present invention.
Figure 7:
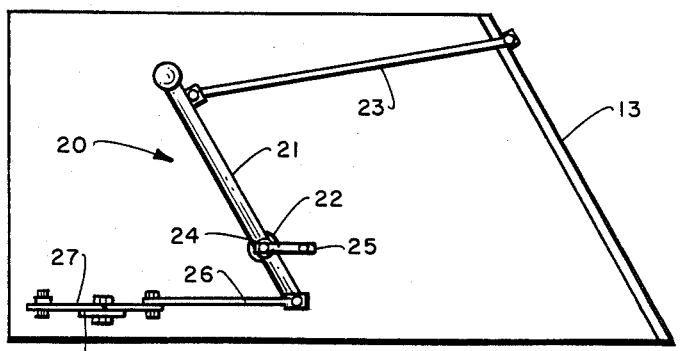
FIG. 7 is a side view of the mechanism shown in FIG. 6 and through plan 7—7 in that figure.

Alternatively, a handle linkage 20 arrangement may be provided (either alone or in conjunction with brace 19). FIG. 4 shows the position of the mechanism that opens forward wall 13. As shown in FIGS. 6 and 7, handle 25 pivots arm 21 about bushing 22. Handle 25 also engages and disengages friction lock 24. The friction lock permits the handle to be held in a fixed position. Rotation of arm 21 clockwise (FIG. 7) moves linkage 23 generally to the right to pivot clockwise forward wall 13. Friction lock 24 permits one to lock forward wall 13 in a fixed position either when canopy 50 is extended (FIG. 3) or when the container is closed and the vehicle is moving (FIG. 1). Arm 21 also extends below bushing 22 where it is pivotally connected to linkage 26. Movement of linkage 26 pivots right-angle bracket 27 about its pivot on bracket 28. Note that arms 27a and 27b (FIG. 6) are of unequal length. Arm 27b connects to push bar 29, which extends through container 10 to engage side wall 15 (FIG. 4). Thus, when arm 21 is pivoted clockwise around bushing 22 causing bar 23 to pivot forward wall 13 to its forward, vertical position, handle 21 also causes linkage 26 to pivot right angle bracket 27. Rotation of that bracket moves push bar 29 to the left (FIG. 6) to pivot side wall 15 to a position parallel to bottom wall 12 extending the sleeping surface of which the top of bottom wall 12 is intended. This is especially useful for taller people.

A second brace 76 folds into container 10 when the canopy is pushed in. Brace 76 is also U-shaped, and the legs pivot near the rear portion of bottom wall 12. The traverse portion extends through a sewn in tunnel 77 in the fabric of canopy 50. When the canopy is moved to its open position (FIG. 3), brace 76 supports the forward portion of roof 52.

Inside surface 34 of the horizontal wall 31 of cover 30 (FIG. 3) acts as another surface above bed 2 of the truck. The surface may not be long enough for an adult bed, but because it is elevated above truck bed 2, its best function is to act as a table. The inside surface 40 of vertical wall 39 can have hooks for storing plates or other items temporarily.

If additional sleeping space is needed, the bed 2 of truck 1 provides sufficient room for a number of sleepers.

Various modifications and changes may be made in the configuration described above that come within the spirit of this invention. The invention embraces all such changes and modifications coming within the scope of the appended claims.

I claim:

1. A collapsible camper comprising:
   (a) a container having base means and means for mounting the base means at an elevated position of a vehicle and cover means and cover mounting means for mounting the cover means in at least two positions to the base means, an upper position generally above the base means and creating a cavity between the base means and the cover means and a lower position depending from the base means below the elevated position of the vehicle;
   (b) canopy means attached to the container and foldable into the cavity and extendible from the base means over the cover means in its lower position to a remote location on the vehicle to act as a tent; and
   (c) anchor means extending between the canopy means and the vehicle for anchoring the canopy means to remote location,
   wherein the base means has a forward edge extending parallel to the front of the vehicle at the forward portion of the base means and a rear edge generally parallel to and rearward of the forward edge, the cover mounting means comprising a hinge mounted along the rear edge for hinging the cover means relative to the base means between the upper and lower positions, and the cover means has a generally vertical member extending from the hinge and a horizontal member extending from a upper portion of the vertical member and parallel to the base means in the upper position.

2. The collapsible camper of claim 1 wherein a front member attached to the front edge of the base member and extending to the cover means, the front member acting as a front wall for the container.

3. The collapsible camper of claim 2 wherein the front member is pivotally mounted relative to the front edge of the base means between an angled position for decreasing wind resistance when the vehicle is moving and a generally vertical position to provide additional space above the base means.

4. A collapsible camper comprising:
   (a) a container having base means and means for mounting the base means at an elevated position of a vehicle and cover means and cover mounting means for mounting the cover means in at least two positions to the base means, an upper position generally above the base means and creating a cavity between the base means and the cover means and a lower position depending from the base means below the elevated position of the vehicle;
   (b) canopy means attached to the container and foldable into the cavity and extendible from the base means over the cover means in it slower position to a remote location on the vehicle to act as a tent; and
   (c) anchor means extending between the canopy means and the vehicle for anchoring the canopy means to remote location, wherein the base means has a forward edge extending parallel to the front of the vehicle at the forward portion of the base means and a rear edge generally parallel to and rearward of the forward edge, the cover means having a horizontal member extending rearwardly and parallel to the plane of the base means below the base means to act as a supporting surface when the cover means is in its lower position.

5. The collapsible camper of claim 1 further comprising strut means attached to the canopy means and mounted to the base means for supporting the canopy above the base means when the canopy is extended from the cavity.

6. A collapsible camper comprising:
   (a) a container having base means and means for mounting the base means at an elevated position of a vehicle and cover means and cover mounting means for mounting the cover means in at least two positions to the base means, an upper position generally above the base means and creating a cavity between the base means and the cover means and a lower position depending from the base means below the elevated position of the vehicle;
   (b) canopy means attached to the container and foldable into the cavity and extendible from the base means over the cover means in it slower position to a remote location on the vehicle to act as a tent; and
   (c) anchor means extending between the canopy means and the vehicle for anchoring the canopy means to remote location, wherein the anchor means comprises a U-shaped brace having downwardly extending legs attachable to the vehicle, the top of the brace extending upward and away from the base means for holding the top of the canopy in a relatively tight configuration.

7. The collapsible camper of claim 6 wherein the legs of the brace are adjustable in length.

8. A collapsible camper comprising:
   (a) a container having base means and means for mounting the base means at an elevated position of a vehicle and cover means and cover mounting means for mounting the cover means in at least two positions to the base means, an upper position generally above the base means and creating a cavity between the base means and the cover means and a lower position depending from the base means below the elevated position of the vehicle;
   (b) canopy means attached to the container and foldable into the cavity and extendible from the base means over the cover means in its lower position to a remote location on the vehicle to act as a tent; and (c) anchor means extending between the canopy means and the vehicle for anchoring the canopy means to remote location; and
(d) a side member attached to at least one side of the base means and side mounting means for mounting the side member between an upright position extending between the base means and the cover means when the cover is in its upper position and a horizontal position extending generally sideways from the base means to extend the surface of the base means.

9. The collapsible camper of claim 8 wherein the side mounting means comprises a side hinge for pivoting the side member to the side of the base means, a front member pivotally mounted relative to the front edge of the base means between an angled position for decreasing wind resistance when the vehicle is moving and a generally vertical position to provide additional space above the base means, linkage means extending to the front member and the side member for pivoting the front member and the side member simultaneously.

* * * * *